United States Patent
Delaloye

(10) Patent No.: US 8,113,317 B2
(45) Date of Patent: Feb. 14, 2012

(54) ELECTRIC MOTOR DRIVEN LUBRICATION PUMP CONTROL SYSTEM AND METHOD THAT ACCOMODATES TURBOMACHINE WINDMILL OPERATION

(75) Inventor: Jim E. Delaloye, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 1193 days.

(21) Appl. No.: 11/774,083

(22) Filed: Jul. 6, 2007

(65) Prior Publication Data

US 2010/0023169 A1    Jan. 28, 2010

(51) Int. Cl.
- F01M 9/00 (2006.01)
- F01M 1/04 (2006.01)
- F01D 25/18 (2006.01)
- F01D 17/06 (2006.01)
- F01D 21/02 (2006.01)
- F01B 25/06 (2006.01)
- F03B 15/06 (2006.01)
- F04D 15/00 (2006.01)
- F04D 27/00 (2006.01)
- F03D 3/06 (2006.01)

(52) U.S. Cl. ........... 184/6.3; 184/6.5; 184/6.11; 415/30; 416/44

(58) Field of Classification Search .............. 184/6.3, 184/6.4, 6.5, 6.11, 6.12, 6.26; 415/30; 416/44
See application file for complete search history.

(56) References Cited

U.S. PATENT DOCUMENTS

| | | | | |
|---|---|---|---|---|
| 3,149,678 A | * | 9/1964 | Chilman et al. | 244/58 |
| 3,315,085 A | * | 4/1967 | Kouns et al. | 290/4 R |
| 3,626,693 A | * | 12/1971 | Guillot | 60/39.281 |
| 3,635,583 A | * | 1/1972 | Chilman et al. | 416/48 |
| 3,779,345 A | * | 12/1973 | Barnes et al. | 184/6.4 |
| 4,284,174 A | * | 8/1981 | Salvana et al. | 184/6.4 |
| 4,411,596 A | * | 10/1983 | Chilman | 416/51 |
| 4,424,665 A | * | 1/1984 | Guest et al. | 60/779 |
| 4,431,372 A | * | 2/1984 | Dadhich | 415/175 |
| 4,676,458 A | * | 6/1987 | Cohen | 244/58 |
| 4,717,000 A | * | 1/1988 | Waddington et al. | 184/6.1 |
| 4,717,095 A | * | 1/1988 | Cohen et al. | 244/58 |
| 4,742,976 A | * | 5/1988 | Cohen | 244/58 |
| 4,954,974 A | * | 9/1990 | Howell et al. | 701/100 |
| 5,064,351 A | * | 11/1991 | Hamey et al. | 417/222.1 |
| 5,122,036 A | * | 6/1992 | Dickes et al. | 417/222.1 |
| 5,123,614 A | * | 6/1992 | Whitehouse | 244/58 |
| 5,145,324 A | * | 9/1992 | Dickes et al. | 417/222.1 |
| 5,159,910 A | * | 11/1992 | Ninomiya et al. | 123/196 AB |
| 5,174,719 A | * | 12/1992 | Walsh et al. | 416/142 |
| 5,180,034 A | * | 1/1993 | Lopes | 184/6.1 |

(Continued)

OTHER PUBLICATIONS

USPTO Office Action for U.S. Appl. No. 12/174,553; Notification date Aug. 23, 2011.

(Continued)

Primary Examiner — Michael Mansen
Assistant Examiner — Henry Liu
(74) Attorney, Agent, or Firm — Ingrassia Fisher & Lorenz, P.C.

(57) ABSTRACT

A system and method are provided to selectively control lubricant supply flow to one or more rotating machines in an aircraft when the rotating machines are windmilling. A controller determines if the rotating machines are windmilling. When the rotating machines are windmilling, the controller at least selectively energizes an electric motor driven lubrication pump, to thereby supply lubricant to the windmilling turbomachine.

14 Claims, 1 Drawing Sheet

U.S. PATENT DOCUMENTS

| | | | | |
|---|---|---|---|---|
| 5,201,798 A * | 4/1993 | Hogan | | 60/791 |
| 5,249,924 A * | 10/1993 | Brum | | 416/48 |
| 5,440,490 A * | 8/1995 | Summerfield | | 701/100 |
| 5,474,041 A * | 12/1995 | Free et al. | | 123/196 CP |
| 5,484,120 A * | 1/1996 | Blakeley et al. | | 244/54 |
| 5,820,074 A * | 10/1998 | Trommer et al. | | 244/58 |
| 6,127,758 A * | 10/2000 | Murry et al. | | 310/168 |
| 6,331,099 B1 * | 12/2001 | Eccles et al. | | 416/142 |
| 6,895,325 B1 | 5/2005 | Munson, Jr. | | |
| 7,118,336 B2 * | 10/2006 | Waddleton | | 416/1 |
| 7,350,751 B2 * | 4/2008 | Hawkins | | 244/101 |
| 7,387,189 B2 * | 6/2008 | James et al. | | 184/6.11 |
| 7,571,597 B2 * | 8/2009 | Delaloye | | 60/39.08 |
| 7,622,817 B2 * | 11/2009 | El-Refaie et al. | | 290/52 |
| 7,662,059 B2 * | 2/2010 | McCune | | 475/159 |
| 7,849,668 B2 * | 12/2010 | Sheridan | | 60/39.08 |
| 7,883,438 B2 * | 2/2011 | McCune | | 475/159 |
| 2001/0049249 A1 * | 12/2001 | Tachau et al. | | 446/397 |
| 2006/0054406 A1 * | 3/2006 | Delaloye | | 184/6.11 |
| 2006/0226286 A1 * | 10/2006 | Hawkins | | 244/102 R |
| 2007/0237640 A1 * | 10/2007 | Russ | | 416/142 |
| 2008/0096714 A1 * | 4/2008 | McCune | | 475/159 |
| 2008/0098712 A1 * | 5/2008 | Sheridan | | 60/226.1 |

OTHER PUBLICATIONS

Response to USPTO Office Action for U.S. Appl. No. 12/174,553; Dated Aug. 26, 2011.

* cited by examiner

ELECTRIC MOTOR DRIVEN LUBRICATION PUMP CONTROL SYSTEM AND METHOD THAT ACCOMODATES TURBOMACHINE WINDMILL OPERATION

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention relates to turbomachine lubrication and, more particularly, to a system and method for controlling an electric motor driven lubrication supply pump during windmill operation of a turbomachine.

BACKGROUND

Most aircraft generate electrical power via the main engines, which also provide the propulsion thrust. Many aircraft also include an additional turbine engine, known as an auxiliary power unit, which may be used as a backup or supplemental electrical power source, when the aircraft is in flight or on the ground. Some aircraft additionally include a ram air turbine to accommodate the unlikely, yet postulated, complete loss of other power generating sources. Although ram air turbines are most typically found in military aircraft, where such a postulated event may be more likely, many non-military aircraft also include ram air turbines.

A ram air turbine is typically disposed within the aircraft fuselage in a stowed position, and is moved to a deployed position, external of the aircraft fuselage, when needed to supply electrical, hydraulic, and/or pneumatic power. A ram air turbine may include a propeller, or other suitable device, coupled to a generator, a mechanical shaft, and/or other device. When the ram air turbine is moved to the deployed position, ram air flow past the propeller causes the propeller to rotate, which in turn drives the generator, mechanical shaft, and/or other device to supply electrical, hydraulic, and/or pneumatic power.

In some aircraft configurations, one or more turbomachine inlets are in fluid communication with the ram air turbine flow path. Thus, when the ram air turbine is deployed, some ram air flow is supplied to the turbomachine inlet(s). Depending on the flow rate of the ram air to the turbomachine inlet(s), the turbomachine(s) may be driven by the ram air flow in a "windmilling" operational condition. Moreover, in some aircraft configurations, a non-operating turbomachine may receive air flow from sources other than ram air turbine flow path, causing it to be driven in a windmilling operational condition. No matter the particular source of the air flow to the turbomachine(s), the rotational speed of the turbomachine(s) during windmill operation may, in some instances, be sufficiently high that damage could occur if lubrication cooling flow is not supplied to the certain components. Typically, however, when the ram air turbine is deployed various auxiliary systems, such as the turbomachine lubrication supply system, may not be operating.

Hence, there is a need for a system and method of supplying lubrication cooling flow to one or more windmilling turbomachines. The present invention addresses at least this need.

BRIEF SUMMARY

The present invention provides a system and method that selectively controls lubricant supply flow to one or more rotating machines in an aircraft when the rotating machines are windmilling.

In one embodiment, and by way of example only, an aircraft lubrication supply system includes a motor, a pump, and a controller. The motor is operable, upon being energized from a power source, to rotate and supply a drive force. The pump is coupled to receive the drive force from the motor and is operable, upon receipt thereof, to supply lubricant to a rotating machine. The controller is adapted to receive one or more signals indicating that the rotating machine is operating in a windmill operational condition and is operable, in response to the one or more signals, to at least selectively energize the motor from the power source.

In another exemplary embodiment, an aircraft lubrication supply system includes a ram air turbine, a turbomachine, a motor, a pump, and a controller. The ram air turbine is selectively movable between a stowed position and a deployed position, and is configured, when in the deployed position, to receive a flow of ram air. The turbomachine is disposed to receive a portion of the flow of ram air when the ram air turbine is in the deployed position. The motor is operable, upon being energized from a power source, to rotate and supply a drive force. The pump is coupled to receive the drive force from the motor and is operable, upon receipt thereof, to supply lubricant to the turbomachine. The controller is adapted to receive a signal representative of ram air turbine position. The controller is operable, in response to the signal, to determine at least when the ram air turbine is in the deployed position, and to at least selectively energize the motor from the power source at least when the ram air turbine is determined to be in the deployed position.

In yet another exemplary embodiment, a method of controlling an electric motor driven lubrication supply pump that supplies lubrication to a rotating machine includes determining when the rotating machine is operating in a windmill operational condition. The electric motor driven lubrication pump is at least selectively energized when the rotating machine is operating in the windmill operational condition.

Other independent features and advantages of the preferred lubrication supply system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
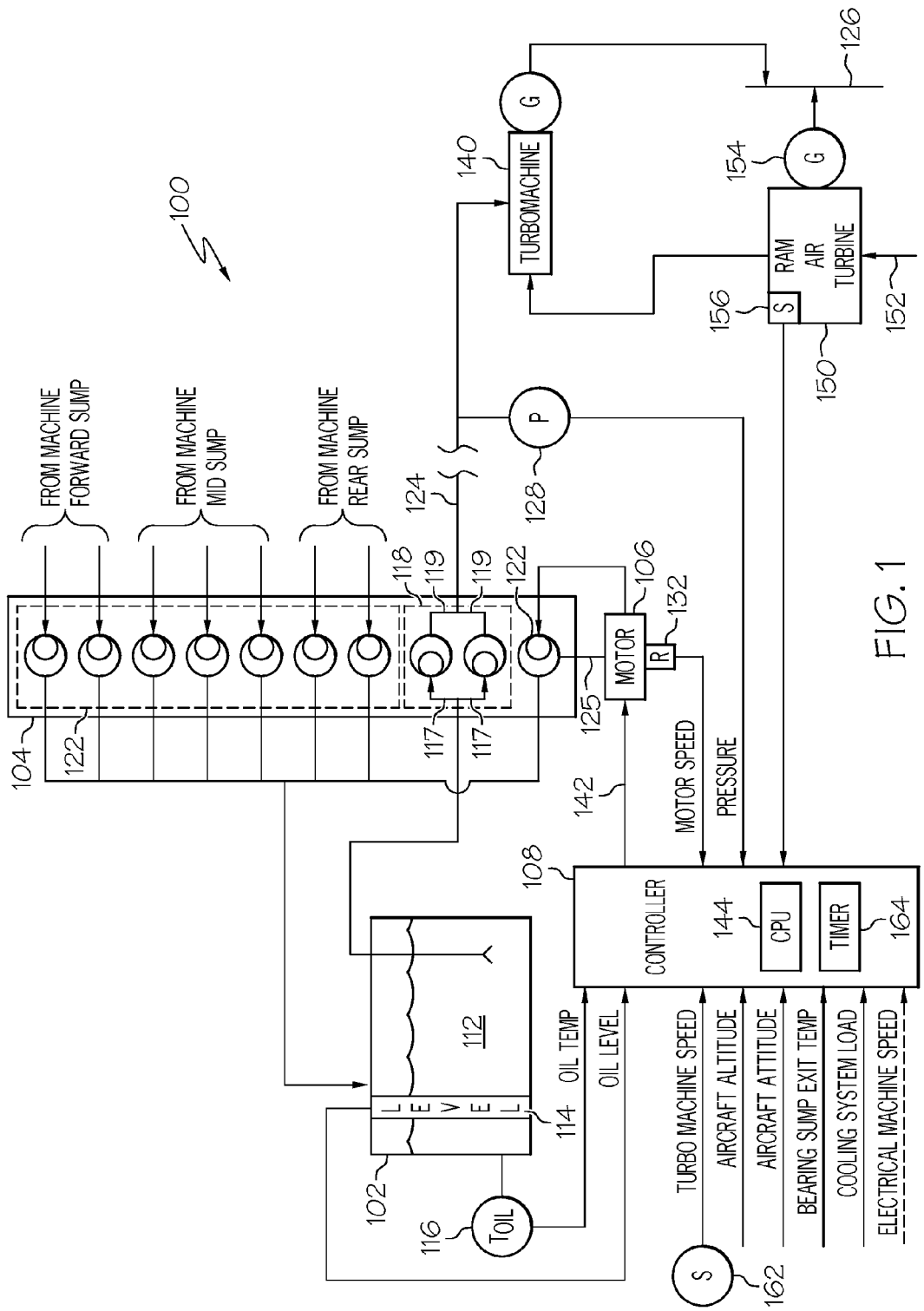
FIG. 1, which is the sole FIGURE, is a schematic diagram of an aircraft lubrication supply system according to an exemplary embodiment of the present invention.

The following detailed description is merely exemplary in nature and is not intended to limit the invention or its application and uses. Furthermore, there is no intention to be bound by any theory presented in the preceding background or the following detailed description. In this regard, although the system is depicted and described as supplying lubricant to a turbomachine, it will be appreciated that the invention is not so limited, and that the system and method described herein may be used to supply lubricant to any one of numerous airframe mounted rotating machines. Moreover, although the depicted system includes a ram air turbine, the system may be implemented, as described herein, without the ram air turbine.

With reference now to FIG. 1, a schematic diagram of an exemplary aircraft lubrication supply system 100 is depicted, and includes a reservoir 102, a pump assembly 104, a motor 106, and a controller 108. The reservoir 102 is used to store a supply of lubricant 112 such as, for example, oil or other suitable hydraulic fluid. A level sensor 114 and a temperature sensor 116 may be installed within, or on, the reservoir 102. The level sensor 114, if included, senses the level of lubricant in the reservoir 102 and supplies a level signal representative of the sensed level to the controller 108. The temperature sensor 116, if included, senses the temperature of the lubricant in the reservoir 102 and supplies a temperature signal representative of the sensed temperature to the controller 108.

The pump assembly 104 is configured to draw lubricant from, and return used lubricant to, the reservoir 102. In the depicted embodiment the pump assembly 104 includes a plurality of supply pumps 118 and a plurality of return pumps 122. The supply pumps 118 each include a fluid inlet 117 and a fluid outlet 119. The supply pump fluid inlets 117 are each coupled to the reservoir 102, and the supply pump fluid outlets are each coupled to a lubricant supply conduit 124. The supply pumps 118, when driven, draw lubricant 112 from the reservoir 102 into the fluid inlets 117 and discharge the lubricant, at an increased pressure, into the fluid supply conduit 124, via the fluid outlets 119. The lubricant supply conduit 124, among other potential functions, supplies the lubricant to one or more rotating machines. Although one or more various types of machines could be supplied with the lubricant, in the depicted embodiment the lubricant is supplied to a rotating turbomachine. It will be appreciated that each of the pumps 118, 122 that comprise the pump assembly 104 could be implemented as any one of numerous types of centrifugal or positive displacement type pumps, but in the preferred embodiment each pump 118, 122 is implemented as a positive displacement pump.

The lubricant that is supplied to the rotating turbomachine flows to various components within the turbomachine and is collected in one or more sumps in the turbomachine. The lubricant that is collected in the turbomachine sumps is then returned to the reservoir 102 for reuse. To do so, a plurality of the return pumps 122 draws used lubricant from the turbomachine sumps and discharges the used lubricant back into the reservoir 102 for reuse. Before proceeding further it will be appreciated that the configuration of the pump assembly 104 described herein is merely exemplary, and that the pump assembly 104 could be implemented using any one of numerous other configurations. For example, the pump assembly 104 could be implemented with a single supply pump 118 and a single return pump 122, or with just one or more supply pumps 118. No matter how many supply or return pumps 118, 122 are used to implement the pump assembly 104, it is seen that each pump 118, 122 is mounted on a common pump assembly shaft 125 and is driven via a drive force supplied from the motor 106.

The motor 106 is coupled the pump assembly shaft 125 and is operable, upon being energized from a power source 126, to supply a drive force to the pump assembly 104 that drives the pumps 118, 122. In the depicted embodiment the motor 106 is directly coupled to the pump assembly shaft 125. It will be appreciated, however, that the motor 106, if needed or desired, could be coupled to the pump assembly shaft 125 via one or more gear assemblies, which could be configured to either step up or step down the motor speed. It will additionally be appreciated that the motor 106 could be implemented as any one of numerous types of AC or DC motors, but in a particular preferred embodiment the motor 106 is implemented as a brushless DC motor.

The controller 108 is coupled to, and selectively energizes, the motor 106 from the power source 126. The controller 108 preferably implements control logic via, for example, a central processing unit 144 that selectively energizes the motor 106 from the power source 126 to thereby control the rotational speed of the motor 106. It will be appreciated that the control logic implemented by the controller 108 may be any one of numerous control laws. For example, the control logic may implement a closed-loop pressure control law, or a closed-loop speed control law. If the controller 108 implements a closed-loop pressure control law, the system 100 may include one or more pressure sensors 128 (only one depicted) to sense lubricant pressure and to supply a pressure feedback signal representative of the sensed pressure to the controller 108. Moreover, if the controller 108 implements a closed-loop speed control law, the system 100 may include one or more rotational speed sensors 132 (only one depicted) to sense motor rotational speed and to supply a rotational speed feedback signal representative of the sensed rotational speed to the controller 108. It will be appreciated that the controller 108 may additionally receive signals representative of various turbomachine and/or aircraft operational parameters. If so configured, the control logic in the controller 108, based at least in part on these signals, preferably determines an appropriate lubricant supply pressure and/or flow rate and selectively energizes the motor 106 so that it will rotate at least the supply pumps 118 at a speed that will supply lubricant at the appropriate lubricant supply pressure and/or flow rate. Some non-limiting examples of various turbomachine and aircraft operational parameters that may be supplied to the controller 108 are depicted in FIG. 1.

As was previously noted, in some aircraft configurations, the turbomachine 140 may receive air flow from various sources when it is not operating, causing it to be driven in a windmill operational condition. The windmill rotation speed of the turbomachine 140 may be sufficiently high that lubrication flow may need to be supplied to at least portions of the turbomachine 140. To accommodate this, the controller 108 is further configured to determine when the turbomachine 140 is operating in the windmill operational condition and, when the turbomachine 140 is determined to be operating in the windmill operational condition, to at least selectively energize the motor 106. Various configurations for implementing this functionality will now be described.

Depending on the particular aircraft configuration, and as was also previously noted, if the aircraft includes a ram air turbine, the turbomachine 140 may be in fluid communication with the ram air turbine when it is deployed. Thus, when ram air flows past the ram air turbine, a portion of the ram air may drive the turbomachine 140 in the windmill operational condition. For such aircraft configurations, the controller 108 may determine that the turbomachine 140 is operating in the windmill operational condition at least when the ram air turbine is deployed. The system 100 depicted in FIG. 1 includes a ram air turbine 150 and as such will now be further described.

The ram air turbine 150 is movable between a stowed position and a deployed position. In the stowed position, the ram air turbine 150 is disposed within the aircraft fuselage. Conversely, in the deployed position, the ram air turbine 150 is disposed external to the aircraft fuselage and into the passing air stream. As a result, ram air 152 flows past the ram air turbine 150 causing it to rotate and supply electrical, hydraulic, and/or pneumatic power to various electrical, hydraulic, and/or pneumatic loads. For example, the ram air turbine 150 may supply electrical power, via a generator 154, to the power source 126. The ram air turbine 150 may additionally supply hydraulic power, via a non-illustrated shaft, to one or more non-illustrated hydraulic loads, and/or may supply pneumatic power to one or more non-illustrated pneumatic loads such as, for example, avionics cooling, flight suit pressurization, and life support, just to name a few.

Preferably, during normal aircraft operations the ram air turbine 150 is in the stowed position, and thus does not supply electrical, hydraulic, and/or pneumatic power. However, in the unlikely event that the ram air turbine 150 is needed to supply power while the aircraft is in flight, the ram air turbine 150 is moved, preferably automatically, to the deployed position. It will be appreciated that the conditions under which the ram air turbine 150 may be needed to generate electrical power, and thus moved to the deployed position, are numerous and varied.

In the depicted embodiment, a ram air turbine position sensor 156 is coupled to the ram air turbine 150. The ram air turbine position sensor 156, which may be any one of numerous types of position sensors, is configured to sense the position of the ram air turbine 150 and supply a position signal representative thereof to the controller 108. The controller 108 is configured, in response to the position signal, to determine the position of the ram air turbine 150. In the depicted embodiment, the controller 108 is configured to energize, or at least selectively energize, the motor 106 from the power source 126 when the ram air turbine 150 is in the deployed position. It will be appreciated that the controller 108 could alternatively be configured to energize, or at least selectively energize, the motor 106 from the power source 126 when the ram air turbine 150 is in any one of one of numerous non-stowed positions, not just the fully deployed position.

Rather than selectively energizing the motor 106 whenever the ram air turbine 150 is in the deployed or other non-stowed position, the controller 108 may alternatively be configured to energize, or at least selectively energize, the motor 106 based on other conditions, in addition to ram air turbine position. For example, the controller 108 may be configured to energize, or at least selectively energize, the motor 106 from the power source 126 when the ram air turbine 150 is in the deployed or other non-stowed position and when turbomachine rotational speed exceeds a predetermined speed. In such an embodiment, the controller 108 is preferably coupled to additionally receive a signal representative of turbomachine speed from a speed sensor 162. It may thus be appreciated that if, during ram air turbine 150 deployment, turbomachine speed does not exceed the predetermined speed, then the controller 108 will not energize the motor 106 from the power source 126. It will be appreciated that with this embodiment the system 100 is preferably configured such that the speed sensor 162 receives electrical power when the ram air turbine 150 is deployed.

In addition to the above, it will be appreciated that the controller 108 may be configured to energize, or at least selectively energize, the motor 106 from the power source 126 when the ram air turbine 150 is in the deployed or other non-stowed position and if turbomachine rotational speed exceeds the predetermined speed for a predetermined period of time. In such an embodiment, the controller 108, in addition to receiving the signal representative of turbomachine speed from the speed sensor 162, also implements a timer 164. It may thus be appreciated that if, during ram air turbine 150 deployment, turbomachine speed does not exceed the predetermined value for the predetermined period of time, then the controller 108 will not energize the motor 106 from the power source 126. It will again be appreciated that with this embodiment the system 100 is preferably configured such that the speed sensor 162 receives electrical power when the ram air turbine 150 is deployed.

It will additionally be appreciated that the controller 108 may be configured to determine that the turbomachine 140 is operating in the windmill operational condition, and thus energize, or at least selectively energize, the motor 106 from the power source 126, based on one or more signals other than ram air turbine position. For example, the controller 108 may determine that the turbomachine 140 is operating in the windmill operational condition based solely on turbomachine speed. In particular, if the turbomachine is in a non-operational state and turbomachine rotational speed exceeds the predetermined speed, then the controller 108 may determine that the turbomachine 140 is operating in the windmill operational condition. The controller 108 may additionally, or instead, determine that the turbomachine 140 is operating in the windmill operational condition if turbomachine rotational speed exceeds the predetermined speed for the predetermined period of time. For such embodiments, the controller 108 preferably receives at least the signal representative of turbomachine speed from the speed sensor 162. Moreover, the controller 108 may additionally implement the timer 164.

The system described herein is configured to, and implements a method that, supplies, or at least selectively supplies, lubrication cooling flow to one or more windmilling machines, such as one or more turbomachines. As a result, potential damage to the windmilling machines may be prevented, or at least substantially inhibited.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aircraft lubrication supply system, comprising:
    an electric motor operable, upon being energized from a power source, to rotate and supply a drive force;
    a pump coupled to receive the drive force from the electric motor and operable, upon receipt thereof, to supply lubricant to a rotating machine;
    a rotational speed sensor operable to sense rotational speed of the rotating machine and to supply a rotational speed signal representative thereof; and
    a controller adapted to receive one or more signals indicating that the rotating machine is operating in a windmill operational condition and coupled to receive the rotational speed signal from the rotational speed sensor, the controller operable, in response to the one or more signals and to the rotational speed signal, to:
    (i) determine that the rotating machine is operating in the windmill condition,
    (ii) determine when the rotational speed exceeds a predetermined value, and
    (iii) at least selectively energize the electric motor from the power source when (a) the rotating machine is operating in the windmill operational condition and (b) the rotational speed exceeds the predetermined value.

2. The system of claim 1, further comprising:
a ram air turbine selectively movable between a stowed position and a deployed position;
wherein the one or more signals include a signal that indicates the ram air turbine is in the deployed position.

3. The system of claim 2, wherein:
the ram air turbine is configured, when in the deployed position, to receive a flow of ram air and, in response thereto, to generate electrical power; and
the power source from which the motor is energized is the ram air turbine.

4. The system of claim 1, wherein the controller is further operable to:
determine an amount of time that the rotational speed exceeds the predetermined speed value; and
at least selectively energize the electric motor from the power source at least when (a) the rotating machine is operating in the windmill operational condition, (b) the rotational speed exceeds the predetermined value, and (c) the rotational speed exceeds the predetermined value a predetermined amount of time.

5. The system of claim 4, wherein the controller comprises a timer configured to determine the amount of time that the turbomachine rotational speed exceeds the predetermined speed value.

6. The system of claim 1, further comprising:
one or more pressure sensors disposed downstream of the pump, the one or more pressure sensors configured to sense fluid pressure and supply a pressure feedback signal representative thereof to the controller.

7. The system of claim 6, wherein the controller is configured to implement a closed-loop pressure control law that uses the pressure feedback signal.

8. The system of claim 1, further comprising:
a motor rotational speed sensor configured to sense motor rotational speed and supply a speed feedback signal representative thereof to the controller.

9. The system of claim 8, wherein the controller implements a closed-loop speed control law that uses the speed feedback signal.

10. The system of claim 1, wherein the controller is further adapted to receive one or more signals representative of aircraft operating conditions.

11. An aircraft lubrication supply system, comprising:
a ram air turbine selectively movable between a stowed position and a deployed position, the ram air turbine configured, when in the deployed position, to receive a flow of ram air;
a turbomachine disposed to receive a portion of the flow of ram air when the ram air turbine is in the deployed position;
a rotational speed sensor coupled to, and operable to supply a rotational speed signal representative of, turbomachine rotational speed;
an electric motor operable, upon being energized from a power source, to rotate and supply a drive force;
a pump coupled to receive the drive force from the electric motor and operable, upon receipt thereof, to supply lubricant to the turbomachine;
a controller adapted to receive a signal representative of ram air turbine position and coupled to receive the rotational speed signal, the controller operable, in response to these signals, to;
(i) determine at least when the ram air turbine is in the deployed position,
(ii) determine when the turbomachine rotational speed exceeds a predetermined value, and
(iii) at least selectively energize the electric motor from the power source at least (a) when the ram air turbine is determined to be in the deployed position and (b) the turbomachine rotational speed exceeds the predetermined value.

12. The system of claim 11, wherein the controller is further operable to:
determine an amount of time that the turbomachine rotational speed exceeds the predetermined speed value; and
at least selectively energize the electric motor from the power source at least when (a) the ram air turbine is in the deployed position, (b) the turbomachine rotational speed exceeds the predetermined value, and (c) the turbomachine rotational speed exceeds the predetermined value a predetermined amount of time.

13. The system of claim 12, wherein the controller includes a timer configured to determine the amount of time that the turbomachine rotational speed exceeds the predetermined speed value.

14. The system of claim 11, wherein:
the ram air turbine is configured, when in the deployed position, to receive a flow of ram air and, in response thereto, to generate electrical power; and
the power source from which the electric motor is energized is the ram air turbine.

* * * * *